United States Patent

[11] 3,600,094

| [72] | Inventor | John W. Liskowitz<br>Belle Meade, N.J. |
|---|---|---|
| [21] | Appl. No. | 774,895 |
| [22] | Filed | Nov. 12, 1968 |
| [45] | Patented | Aug. 17, 1971 |
| [73] | Assignee | American Standard Inc.<br>New York, N.Y.<br>Continuation-in-part of application Ser. No. 629,568, Apr. 10, 1967. |

[54] SUSPENDED SOLIDS CONCENTRATION MEASUREMENT USING CIRCULAR POLARIZED LIGHT
15 Claims, 4 Drawing Figs.

[52] U.S. Cl. ..................................... 356/102,
356/104, 356/114, 356/118
[51] Int. Cl. ..................................... G01n 15/02,
G01n 21/00, G01n 21/40
[50] Field of Search .......................... 356/102–104, 114–118, 207, 208

[56] References Cited
UNITED STATES PATENTS

| 2,858,727 | 11/1958 | Stamm et al. | 356/104 |
|---|---|---|---|
| 2,877,683 | 3/1959 | Fischer | 250/218 X |
| 3,283,644 | 11/1966 | Saltzman | 356/114 |
| 3,373,652 | 3/1968 | Flader | 356/115 X |
| 3,450,477 | 6/1969 | Meltzer | 356/114 |
| 3,420,609 | 1/1969 | Kozawa | 356/104 |

OTHER REFERENCES

Vogel et al., Rev. Sci. Inst., V. 38, N. 4 4/67, pp 499— 501 356/104.

Weissberger, Phys. Meth., Org. Chem., Interscience Pub, N.Y., 1960, pp. 2125— 2128.

Zimm, J. Chem. Phys., V. 16, N. 12, 12/48, pp. 1099— 1116, 356/104.

Wright, Rev. Sci. Inst., V. 28, N. 2, 2/57, pp 129— 134, 356/104.

*Primary Examiner*—Ronald L. Wibert
*Assistant Examiner*—Warren A. Sklar
*Attorneys*—Sheldon H. Parker, Tennes I. Erstad and Robert G. Crooks

ABSTRACT: A device for optically measuring the amount of particulates in a fluid. Circularly polarized light is directed at a fluid to be analyzed and light which is scattered preferably in a backward direction, that is more than 90° from the direction of the incident beam is analyzed and the ratio of the intensity of light resulting from multiple scattering to the intensity of light resulting from both multiple and primary scattering is determined.

PATENTED AUG 17 1971 3,600,094

INVENTOR.
John W. Liskowitz
BY Sheldon H Parker
ATTORNEY

3,600,094

SUSPENDED SOLIDS CONCENTRATION MEASUREMENT USING CIRCULAR POLARIZED LIGHT

CROSS-REFERENCE TO RELATED APPLICATIONS

This application is a continuation-in-part of the U.S. Pat. application Ser. No. 629,568, filed Apr. 10, 1967.

BACKGROUND OF THE INVENTION

1. Field of the Invention

This invention relates to the measuring of the concentration of solid particles suspended in a fluid, and more particularly to the use of circularly polarized light which is scattered by particles in the fluid, in order to determine the concentration of the particles in the fluid.

2. Description of the Prior Art

It is known, for example that suspended matter in water can be determined by its optical techniques such as light absorption and light scattering techniques. Instruments have been developed for the measurement of turbidity by measuring the light scattered at a definite angle to the incident light, such as 35, 45, 68 or 90 degrees. It has been found to be difficult to correlate particle concentrations as weight of suspended matter to the amount of light scattered in one direction in cases which the particles vary in shape, and/or size, because of the dependency of the measurement system upon particle size and shape. Variations in the intensity of the light source also tend to affect the measurements and therefore very stable light sources are required. The use of an integrating sphere-type of instrument which measures the total amount of light scattered in all directions has been used in order to eliminate the dependency of the system upon particle size and shape.

The depolarization measurements have been used primarily to determine the size and anisotrophy of scattered particles. This normally requires that the concentrations of the solute be varied so that extrapolations to infinite dilution can be achieved. In this manner, secondary or multiple scattering which will interfere with these measurements is eliminated.

Copending U.S. Pat. application Ser. No. 629,568 discloses that the measuring of the degree of depolarization of light which has undergone secondary or multiple scattering, can be used to determine the concentration of solids suspended in a fluid.

SUMMARY OF THE INVENTION

It has now been found that improved results can be obtained through the use of circularly polarized light rather than plane polarized light.

In accordance with the present invention, circularly polarized light is transmitted through the fluid being analyzed, and the light scattered, preferably in a backward direction, from the particles in the fluid, is examined by comparison of the intensity of the light resulting from both multiple and primary scattering. The concentration of solids in the fluid is determined from the relative intensities of the primary and multiple scattered light.

BRIEF DESCRIPTION OF THE DRAWINGS

The objects and advantages of the invention will become evident and will be more fully understood, from the following description when read in conjunction with the drawings wherein.

DESCRIPTION OF THE PREFERRED EMBODIMENTS

Figure 1:
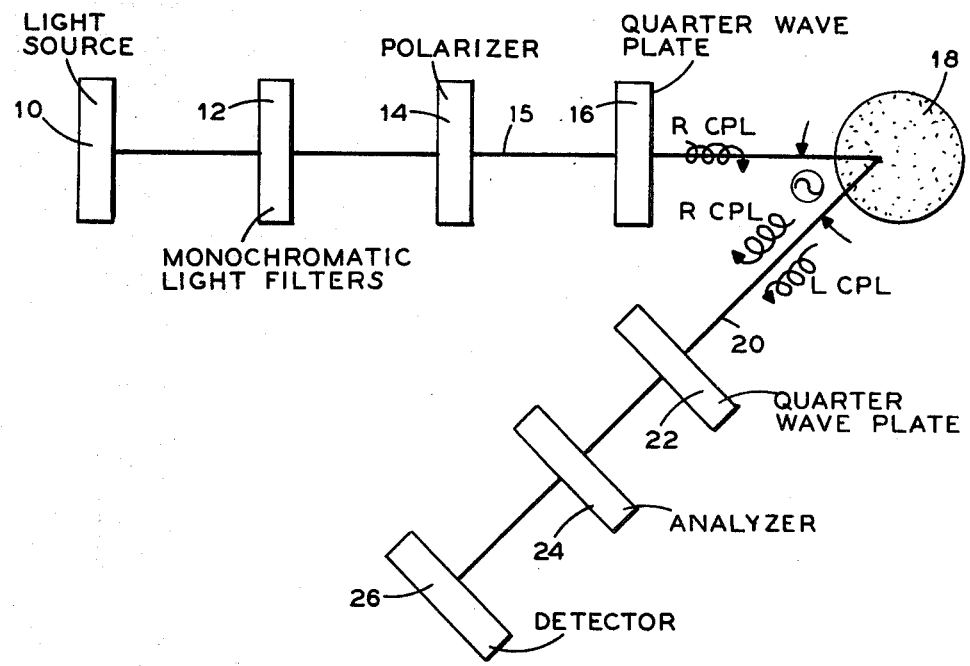
FIG. 1 is a schematic representation of an apparatus in accordance with the present invention.

As shown in FIG. 1, light from a source 10, such as a mercury, tungsten, or xenon lamp is passed through a monochromatic filter 12 in order to limit the light to a relatively narrow range of wavelengths. The light source can either be one which produces only a desired wavelength or filters can be used to restrict the light to monochromatic light.

It should be understood that the monochromatic light filter can be positioned anywhere between the light source and the detector. In a system which employs a pair of analyzers and detectors, it is obviously most advantageous to employ the filter between the light source and the sample rather than between the sample and the detector because in the former case only a single filter unit is required, whereas in the latter case, a pair of equivalent units is required. Differences in the light transmission characteristics in the two filter units will introduce errors into the system.

While the use of monochromatic light is preferred, polychromatic light can be used without filtering. If light of multiple wavelengths is used however, the maximum wavelength should be comparable in length to the diameter of the particles being measured in order to produce the best results.

The light is then plane polarized by means of a conventional polarizer filter 14. A quarter-wave plate 16 is used in order to circularly polarize the light transmitted through the plane polarizer 14. As shown in FIG. 1 the light, which for convenience is indicated as being right circularly polarized light (RCPL) is passed through a fluid medium 18. Scattered light 20 is passed through a quarter-wave plate 22 which is of the same "handedness" as the quarter-wave plate 16. The plate serves to convert the scattered light (RCPL) to plane polarized light (PPL) whose plane is perpendicular to the plane of the polarized light resulting from the conversion of the left circularly polarized light to plane polarized light. It should be noted that a quarter-wave plate 16 which produces left circularly polarized light can be used just as readily as a plate which produces right circularly polarized light. An analyzer 24, is employed which depending upon its orientation, will either transmit light which is vibrating in a plane parallel or perpendicular to the plane of the incident polarized light 15. The amount of energy of the light which passes through the analyzer 24 is measured by means of a detector 26.

The measurement process is directly related to the process used with plane polarized light as disclosed in copending Patent application, Ser. No. 629,568.

Figure 2:
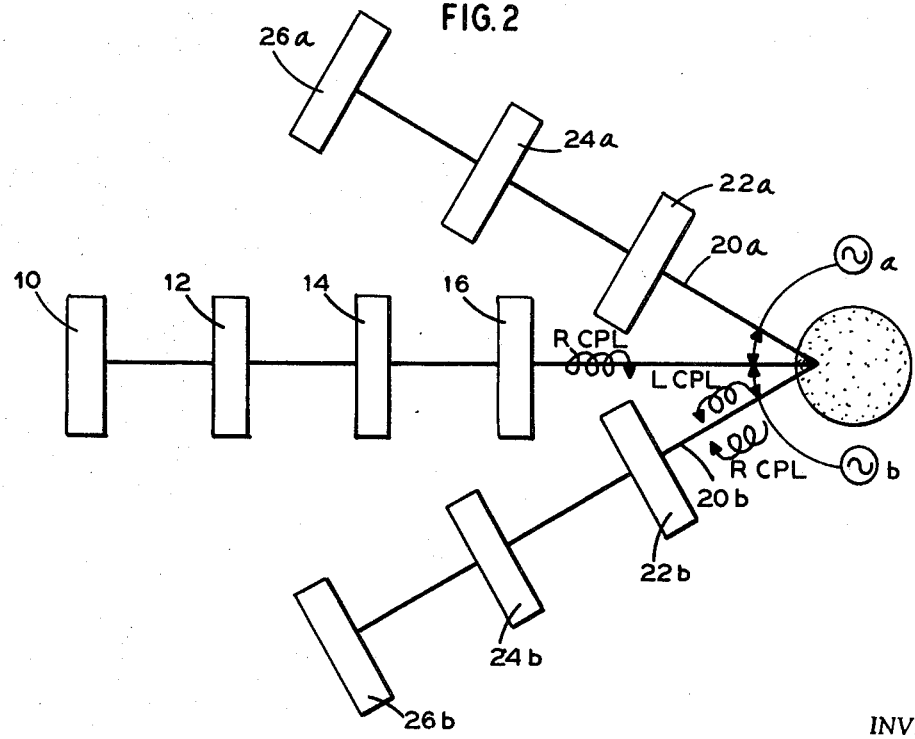
FIG. 2 is a modified apparatus in accordance with the present invention.

As shown in FIG. 2, two simultaneous readings can be taken by employing two one-half sets of measuring units. Both units must be positioned at the exact same angle $\theta$, from the direction of the source of the light. The analyzer 24a can then be oriented so as to permit the passage of light which is perpendicularly oriented with respect to the plane of the light of the polarizer 14($E_\perp$) while the analyzer 24b permits the passage of light which is oriented in a plane parallel with respect to the plane of light from the polarizer 14($E_\parallel$). The detector 26a would then measure light which changed from right circularly polarized light to left circularly polarized light as a result of single or primary scattering and one-half of the intensity of the light which results from multiple scattering. The detector 26b would serve to indicate one-half of the intensity of the light which results from multiple scattering.

The light which undergoes multiple scattering is converted from its "original handedness," that is, from right circularly polarized light to left circularly polarized light, if it underwent an odd number of reflections and will retain its original handedness if it underwent an even number of reflections. Inasmuch as multiple scattered light gives equal number of odd and even reflections, the analyzer 24b will permit the passage of all of the primary scattered circularly polarized light ($E_p$) plus one-half of the multiple scattered light ($E_m$) while the analyzer 24a permits the passage of one-half of the multiple scattered light.
$$\frac{E_m}{2}$$

The relationships are shown by the following equations:

$$E_{\parallel} = E_p + \frac{E_m}{2}$$

$$E_{\perp} = \frac{E_m}{2}$$

$$E_T = E_p + E_m$$

In order to maximize the ratio of multiple scattering to primary scattering, it is advantageous to make the angle $\theta$ as large as possible and preferably no less than 90°.

Figure 3:
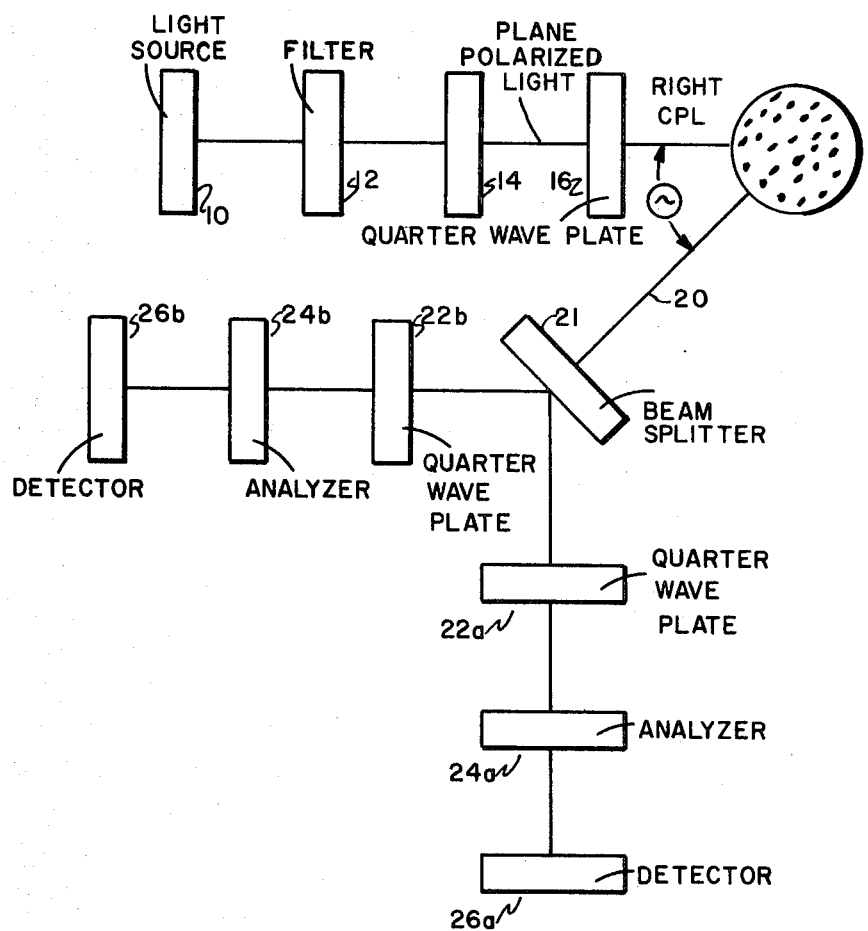
FIG. 3 is a further modification of an apparatus for carrying out the present invention.

Inasmuch as differences between the angle $\theta_a$ and $\theta_b$ can produce errors and, the necessity to rotate the analyzer 24 in the system shown in FIG. 1, prevents simultaneous readings of $E_{\perp}$ and $E_{\parallel}$, a beam splitter 21 can be employed as shown in FIG. 3.

A further alternative which can be employed, is to use a member, such as a quartz crystal, which rotates light.

The member can be positioned between the analyzer 24 and the quarter-wave plate 22. With the member in this position, the effect would be to cause a rotation of the light from the quarter-wave plate 22. Removal of the member permits the direct transmittal of the light from the quarter-wave plate 22 to the analyzer. In the first case the light whose plane is parallel to the plane of the analyzer 24 is precluded from passing through the analyzer 24 because of the rotation induced by the inserted member. When the member is removed from the position between the quarter-wave plate 22 and the analyzer 24 the light which is in a plane perpendicular to the plane of the analyzer 24 is precluded from passing through the analyzer 24. Total scattered radiation is measured by taking a reading with the analyzer removed so that $E_{\perp}$ and $E_{\parallel}$ are received by the detector, simultaneously.

EXAMPLE

Using the apparatus as shown in FIG. 1, a fluid containing a suspended solids which position is noted in the aforementioned figure the angle $\theta$ was set at 150°. The determination of $E_{\perp}$ was made by setting the analyzer so that its optical axis was perpendicular to the axis of the polarizer in the incident beam. The intensity of the multiple scattered light was thus determinable since the intensity of the light reaching the detector was equal to one-half of the total multiple scattered light. In order to avoid the errors which can result from having the angle $\theta$ different between the $E_{\perp}$ and $E_{\parallel}$ determinations, and rather than using two separate analyzers and detectors, analyzer 24 was rotated 90° about an axis perpendicular to its optical axis, thus making its optical axis parallel to the axis of the polarizer in the incident beam.

Figure 4:
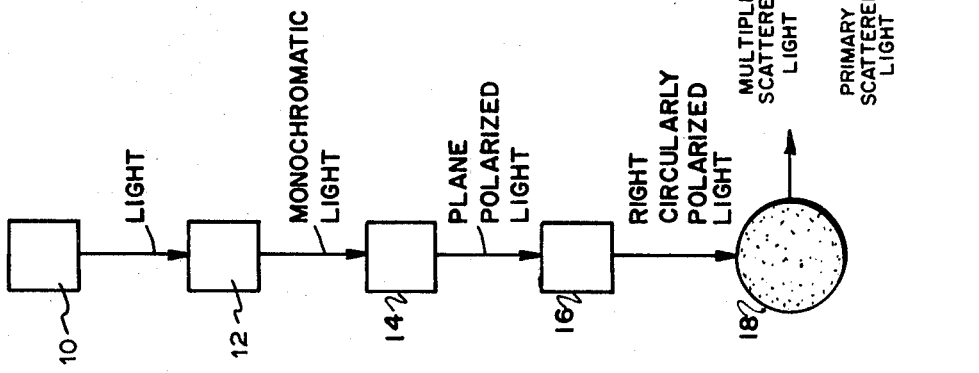
FIG. 4 is a further schematic representation of the present invention.

FIG. 4 shows the foregoing in another manner. Light from the light source 10 is filtered by means of the light filters 12 thus producing monochromatic light which is converted to plane polarized light (PPL) by means of the polarizer 14 and then converted into right circularly polarized light by means of a quarter-wave plate 16. The right circularly polarized light is transmitted to a medium. Light which undergoes multiple scattering is converted equally into right circularly polarized light (RCPL) and left circularly polarized light (LCPL). This is true irrespective of whether the light from the quarter-wave length 16 is right or left circularly polarized. The primary scattered light is converted from RCPL to LCPL. The quarter-wave plate 22 converts both the right and left CPL into plane polarized light. The right circularly polarized light which is converted into plane polarized light is indicated as $PPL_{R(MSL)}$ and the left circularly polarized light which results from multiple scattering and which is converted into plane polarized light is designated $PPL_{L(MSL)}$. The left circularly polarized light resulting from primary scattering is converted into plane polarized light is designated as $PPL_{L(PSL)}$. The plane of $PPL_R$ is perpendicular to the plane of $PPL_L$ and therefore a pairs of analyzers 24a and 24b can be used to separate $PPL_R$ from $PPL_L$. The light which passes through 24b is transmitted to the detector 26b. The intensity of the light recorded by the detector 26b is equal to one-half of the intensity of the light resulting from multiple scattering. Similarly the light which passes through analyzer 24a and which is received by the detector 26a is equal to one-half of the intensity of the multiple scattered light plus the intensity of the primary scattered light. The difference between the intensity recorded by 26a and 26b is equal to the intensity of the primary scattered light. The intensity of the multiple scattered light is equal to twice the intensity recorded by the detector 26b.

The use of circularly polarized light, as compared to plane polarized light, has the advantage of yielding enhanced sensitivity. Circularly polarized light undergoes a phase change as a result of scattering, whereas plane polarized light undergoes depolarization.

Although the invention has been described in its preferred forms with a certain degree of particularity, it is understood that the present disclosure of the preferred forms has been made only by way of example, and that numerous changes in the details of construction and the combination and arrangement of parts may be resorted to without departing from the spirit and scope of the invention.

GLOSSARY OF TERMS

BackScattering—The phenomena of the light having its direction of travel changed by more than 90° from the direction of travel of the incident light.

Multiple Scattering—The scattering of light by a plurality of particles so that the light changes its direction of travel more than once.

Primary Scattering—The scattering of light off a single particle so that the direction of travel is changed only once.

Analyzer—A device, such as a polarizer prism or a polarizing filter which can isolate the component in scattered light vibrating either parallel or perpendicular to the axis of the polarized light. A polarizer prism functions by absorbing the undesired light.

Detector—A device which is used in measuring the intensity of light transmitted from the analyzer. A photocell or photomultiplier can be used.

Quarter-Wave Plate—A device which can convert plane polarized light into either right or left polarized light or right or left circularly polarized light into plane polarized light.

Light—A form of radiant energy, which include ultraviolet, visible and infrared radiation.

I claim:

1. Apparatus for use in detecting particles in a fluid sample, comprising:
    light source means for producing an incident beam of circularly polarized light to illuminate the fluid sample;
    analyzer means positioned on the light source side of the fluid sample for isolating left-handed and right-handed circularly polarized light backscattered by particles in said fluid sample;
    means for detecting right-handed and left-handed circularly polarized light isolated by said analyzer means to produce respective first and second measuring signals; means for utilizing said first and second measuring signals as an indication of primary and multiple scattering of light by particles in said fluid sample.

2. Apparatus of claim 1, wherein said analyzer means is positioned to receive light backscattered in a backward direction, more than 90° from the direction of travel of said incident beam of circularly polarized light.

3. Apparatus of claim 1, wherein said means for detecting right-handed and left-handed circularly polarized light includes a pair of symmetrically positioned detector means, thereby permitting the simultaneous detecting of right-handed and left-handed circularly polarized light, and wherein said analyzer means comprises a pair of symmetrically positioned analyzer means, and at least one of said pair of symmetrically positioned analyzer means includes in series a quarter-wave plate and an analyzer said analyzer selectively transmitting light vibrating in substantially a first plane.

4. Apparatus of claim 3, wherein the other of said pair of symmetrically positioned analyzer means includes in series a quarter-wave plate and an analyzer to selectively transmit light vibrating in substantially a second plane, said second plane being substantially perpendicular to said first plane.

5. The apparatus of claim 1, wherein said analyzer means and said means for detecting are positioned to detect light backscattered at an angle greater than 150°.

6. Apparatus for use in detecting particles in a fluid sample, comprising:
   a. light source means;
   b. polarizer means for circularly polarizing light from said light source means, said light source means and said polarizer means producing an incident beam of circularly polarized light to illuminate the sample;
   c. analyzer means positioned on the light source side of the fluid sample for isolating left-handed and right-handed components of circularly polarized light backscattered by particles in said fluid sample;
   d. first means for detecting one of said components of circularly polarized light backscattered by particles in said fluid sample, said component being of the same handedness as the circularly polarized light of step (b) to produce a first measuring signal;
   e. second means responsive to total light which is scattered in said backward direction by particles in said fluid to produce a second measuring signal;
   f. means for utilizing said first and second measuring signals for detecting particles in said fluid sample.

7. The apparatus of claim 6, wherein said analyzer means is positioned so as to receive light backscattered at an angle greater than 150° with respect to the direction of travel of the incident beam of circularly polarized light.

8. Method for detecting particles suspended in a fluid comprising:
   a. circularly polarizing a beam of light to produce a circularly polarized light beam, and directing the circularly polarized light beam at the fluid to illuminate the fluid;
   b. measuring the intensity of the light resulting from multiple scattering in a backward direction from particles in said fluid;
   c. measuring the intensity of the total light scattered in a backward direction from particles in said fluid;
   d. comparing the intensity of the multiple scattered light with the intensity of the total scattered light as an indication of particles in the fluid.

9. Apparatus for use in detecting particles in a fluid comprising:
   a. a light source;
   b. polarizer, for polarizing light from said light source;
   c. quarter-wave plate in the path of the polarized light from said polarizer for producing a beam of circularly polarizing light which is directed so as to be incident on a test sample of the fluid;
   d. a first independent detector system including in series:
      a quarter-wave plate;
      analyzer;
      a photocell;
   e. a second independent detector system including in series:
      a quarter-wave plate;
      analyzer;
      a photocell;
      the analyzer of said first independent detector system having its optic axis parallel to the axis of said polarizer, and the analyzer of said second independent detector system having its optic axis perpendicular to the axis of said polarizer; and
   f. means for indicating and comparing the outputs of the photocell of the first independent detector system with the output of the photocell of the second independent detector system as an indication of particles in the fluid.

10. The apparatus in claim 1 wherein said detecting means comprises means for simultaneously detecting the left-handed component of circularly polarized light and the right-handed component of circularly polarized light.

11. The apparatus of claim 1 wherein said means for detecting one of said components of circularly polarized light comprises means for sequentially detecting right-handed circular polarized light and left-handed circularly polarized light.

12. The method for determining the concentration of solids suspended in a fluid sample, comprising the steps of:
   a. transmitting circularly polarized light to a fluid to illuminate the fluid sample;
   b. isolating the left-handed and right-handed components of circularly polarized light backscattered by particles in said fluid sample;
   c. measuring the intensity of one of said left-handed and said right-handed components of circularly polarized light to produce a first measuring signal;
   d. measuring the intensity of the total light scattered in a backward direction from particles in said fluid sample to produce a second measuring signal;
   e. comparing the first and second measuring signals as an indication of primary and multiple scattering of light by particles of said fluid sample.

13. Apparatus for use in detecting particles in a fluid sample, comprising:
   a. light source means for producing an incident beam of circularly polarized light to illuminate the fluid sample;
   b. analyzer means positioned on the light source side of the fluid sample for isolating left-handed and right-handed components of circularly polarized light backscattered by particles in said fluid sample;
   c. means for detecting one of said components of circularly polarized light isolated by said analyzer means and the other component of light scattered in a backward direction from particles in the fluid sample to produce respective first and second measuring signals;
   d. means for utilizing said first and second measuring signals as an indication of primary and multiple scattering of light by particles in said fluid sample.

14. The method for determining the concentration of solids suspended in a fluid sample, comprising the steps of:
   a. transmitting circularly polarized light to a fluid sample;
   b. isolating the left-handed and right-handed components of circularly polarized light backscattered by particles in said fluid sample;
   c. measuring the intensity of at least one of said left-handed and said right-handed components of circularly polarized light;
   d. measuring the intensity of the other component of circularly polarized light scattered in a backward direction from particles in said fluid sample;
   e. comparing the respective intensities of said one of said left-handed and right-handed components of circularly polarized light backscattered with the intensity of said other component of light backscattered by particles in the fluid sample as an indication of primary and multiple scattering of light by particles of said fluid sample.

15. Apparatus for use in detecting particles in a fluid sample, comprising:
   a. light source means for producing an incident beam of circularly polarized light;
   b. analyzer means positioned on the light source side of the fluid sample for isolating left-handed and right-handed components of circularly polarized light backscattered by particles in said fluid sample;
   c. means for detecting at least one of said left-handed, and right-handed components of backscattered light from said analyzer means and total light backscattered to produce respective first and second measuring signals;
   d. means for utilizing said first and second measuring signals as an indication of primary and multiple scattering of light by particles in said fluid sample.